US010650415B2

(12) United States Patent
Park

(10) Patent No.: US 10,650,415 B2
(45) Date of Patent: May 12, 2020

(54) METHOD AND SYSTEM FOR REGISTERING LINK INFORMATION TO CONTENT

(71) Applicant: NAVER Corporation, Seongnam-si, Gyeonggi-do (KR)

(72) Inventor: Sung Min Park, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 802 days.

(21) Appl. No.: 15/146,158

(22) Filed: May 4, 2016

(65) Prior Publication Data
US 2016/0328751 A1 Nov. 10, 2016

(30) Foreign Application Priority Data
May 8, 2015 (KR) .................. 10-2015-0064721

(51) Int. Cl.
*G06Q 30/02* (2012.01)
*H04L 12/58* (2006.01)
*G06Q 50/00* (2012.01)

(52) U.S. Cl.
CPC ..... *G06Q 30/0275* (2013.01); *G06Q 30/0226* (2013.01); *G06Q 30/0277* (2013.01); *G06Q 50/01* (2013.01); *H04L 51/10* (2013.01)

(58) Field of Classification Search
CPC .................. G06Q 30/0275; G06Q 30/0277
See application file for complete search history.

(56) References Cited

U.S. PATENT DOCUMENTS 8,782,690 B2 * 7/2014 Briggs ................ H04N 21/435
725/32
8,813,132 B2 * 8/2014 Andrews, II ........... G06Q 30/02
725/60
(Continued)

FOREIGN PATENT DOCUMENTS

JP 2002-063103 A 2/2002
JP 2002-108941 A 4/2002
(Continued)

OTHER PUBLICATIONS

Japanese Office Action dated Jun. 6, 2017 by the Japanese Patent Office corresponding to Japanese patent application No. 2016-094006 (with translation).
(Continued)

*Primary Examiner* — Jacob C. Coppola
(74) *Attorney, Agent, or Firm* — Harness, Dickey & Pierce, P.L.C.

(57) ABSTRACT

A link registration service may enable registration of link information to content, such that a network page associated with the link information may be accessed and displayed at a user terminal based on interaction with the content at the user terminal. The content may be received from a content creator terminal. The content may be set with one or more rights. A right may indicate whether registration of link information to the content to which the right is set is enabled. The link registration service may register the requested link information to received content based on a right set to the content and a registration request received from a link registrant terminal. The link registration service may provide content to which the link information is registered to a user terminal for display.

18 Claims, 12 Drawing Sheets

(56) References Cited

U.S. PATENT DOCUMENTS

| | | | | |
|---|---|---|---|---|
| 9,064,023 B2* | 6/2015 | Hyndman | ............ | G06F 3/04815 |
| 9,532,109 B2* | 12/2016 | Amano | ............ | H04N 21/47815 |
| 9,588,663 B2* | 3/2017 | Abbas | ................. | G11B 27/034 |
| 9,741,057 B2* | 8/2017 | Avedissian | ......... | G06Q 30/0261 |
| 10,061,482 B1* | 8/2018 | Bingham | ............... | G11B 27/00 |
| 2006/0136399 A1* | 6/2006 | Conwell | ................ | G06Q 30/08 |
| 2007/0250901 A1* | 10/2007 | McIntire | ................ | G06Q 30/02 |
| | | | | 725/146 |
| 2007/0260677 A1* | 11/2007 | DeMarco | ........... | H04N 21/4825 |
| | | | | 709/203 |
| 2011/0238646 A1* | 9/2011 | Chamberlain | ......... | G06Q 30/02 |
| | | | | 707/706 |
| 2014/0379494 A1* | 12/2014 | Takata | ............... | G06Q 30/0275 |
| | | | | 705/14.71 |
| 2015/0081454 A1* | 3/2015 | Takata | ............... | G06Q 30/0273 |
| | | | | 705/14.69 |

FOREIGN PATENT DOCUMENTS

| | | |
|---|---|---|
| JP | 2002-304477 A | 10/2002 |
| JP | 2010-515180 A | 5/2010 |
| JP | 2012-013775 A | 1/2012 |
| KR | 10-2012-0004436 A | 1/2012 |
| KR | 10-2014-0002420 A | 1/2014 |
| KR | 10-2014-0054486 A | 5/2014 |
| KR | 10-1436390 B1 | 9/2014 |
| WO | WO-2014/065466 A1 | 5/2014 |

OTHER PUBLICATIONS

Korean Office Action dated May 31, 2016 issued in corresponding Korean Patent Application No. 10-2015-0064721.

* cited by examiner

FIG. 7

|  | | Link replaceable? | |
|---|---|---|---|
|  | | X | O |
| Link registrable? | X | Content 1 | Content 2 |
|  | O | Content 3 | Content 4 |

700

METHOD AND SYSTEM FOR REGISTERING LINK INFORMATION TO CONTENT

CROSS-REFERENCE TO RELATED APPLICATION

This application claims priority under 35 U.S.C. § 119 to Korean Patent Application No. 10-2015-0064721 filed May 8, 2015, in the Korean Intellectual Property Office (KIPO), the entire contents of which are incorporated herein by reference.

BACKGROUND

Field

One or more example embodiments relate to technology for providing a connection to a corresponding webpage by setting an outlink (e.g., a link included in a webpage and pointing to another, separate webpage) to content registered by a content creator.

Description of Related Art

Recently, with the development in mobile Internet technology and commercialization of user terminals, such as smartphones and the like, the use of the mobile Internet at the user terminals is on increase.

As the mobile Internet develops, users may share their daily life with their own acquaintances, friends, etc. ("fellows"), without directly meeting with them, by executing social network service (SNS) exclusive applications installed in terminals.

The users chat with fellows through SNS and may also share photos, videos, etc., with the fellows. According to an increase in a close fellowship between users having the common matter of interest, the advertising market using SNS is also growing.

SUMMARY

One or more example embodiments provide a link registration service method and system, and computer readable recording medium that may receive content, each not set with link information, from a plurality of content creators, may receive link information from a link registrant having only link information, and may register the link information to at least one of the received content, and may provide the content to which the link information is registered.

According to at least one example embodiment, a link registration service method may include receiving at least one instance of content, registering a particular instance of link information to the at least one instance of content, and transmitting the at least one instance of content to which the link information is registered to a user terminal. The at least one instance of content may be associated with a right. The right may indicate that registration of link information to the at least one instance of content from a content creator terminal is enabled. Registration of link information to the at least one instance of content may include associating the at least one instance of content with an external network page associated with the link information. A particular instance of link information may be registered to the at least one instance of content based on the right and further based on receiving a request to register the particular instance of link information to the at least one instance of content. The particular instance of link information may be associated with a particular external network page, such that the registering associates the at least one instance of content with the particular external network page. The at least one instance of content to which the link information is registered may be transmitted to a user terminal, such that the user terminal displays the particular external network page in response to user interaction with the at least one instance of content through a user interface of the user terminal.

The user terminal may not display information associated with the particular instance of link information and information associated with the particular external network page on a common display interface with the at least one instance of content.

Registering the particular instance of link information to the at least one instance of content based on the right may include replacing link information preregistered to the at least one instance of content with the particular instance of link information based on a bidding competition.

Registering the particular instance of link information to the at least one instance of content based on the right may include maintaining registration of preregistered link information to the at least one instance of content for a particular period of elapsed time.

Registering the particular instance of link information to the at least one instance of content based on the right may include selecting the particular instance of link information based on a bidding competition and in response to receiving a request to register a plurality of instances of link information to the at least one instance content.

Registering the particular instance of link information to the at least one instance of content based on the right may include receiving a plurality of content, extracting one or more instances of content from the received content based on the one or more instances of content being associated with the right, identifying the at least one instance of content, from the one or more instances of extracted content, as being associated with a particular keyword, the particular keyword being associated with the particular instance of link information, and transmitting the identified at least one instance of content to the link registrant terminal.

Registering the particular instance of link information to the at least one instance of content based on the right may include registering the particular instance of link information to one or more instances of content selected at the link registrant terminal from among the identified one or more instances of content.

Registering the particular instance of link information to the at least one instance of content based on the right may include registering different instances of link information with separate objects of a plurality of objects included in the at least one instance of content.

Receiving the at least one instance of content may include receiving one or more instances of content from the content creator terminal, the one or more instances of content being associated with a right indicating that registration of link information to the at least one instance of content from a content creator terminal is disabled.

The method may further include generating charge information according to a user connection to the particular external network page, based on the user terminal selecting the at least one instance of content and displaying the particular external network page based on the selecting.

The method may further include generating reward information according to a user connection to the particular external network page, based on the user terminal selecting the at least one instance of content and displaying the particular external network page based on the selecting.

According to at least one example embodiment, a non-transitory computer-readable medium may store computer readable instructions to control a computer system to cause the computer system to perform a method. The method may include receiving at least one instance of content, registering a particular instance of link information to the at least one instance of content, and transmitting the at least one instance of content to which the link information is registered to a user terminal. The at least one instance of content may be associated with a right. The right may indicate that registration of link information to the at least one instance of content from a content creator terminal is enabled. Registration of link information to the at least one instance of content may include associating the at least one instance of content with an external network page associated with the link information. A particular instance of link information may be registered to the at least one instance of content based on the right and further based on receiving a request to register the particular instance of link information to the at least one instance of content. The particular instance of link information may be associated with a particular external network page, such that the registering associates the at least one instance of content with the particular external network page. The at least one instance of content to which the link information is registered may be transmitted to a user terminal, such that the user terminal displays the particular external network page in response to user interaction with the at least one instance of content through a user interface of the user terminal.

According to at least one example embodiment, a link registration service system may include a memory and a processor. The memory may have computer-readable instructions stored therein. The processor may be configured to execute the computer-readable instructions to receive at least one instance of content, register a particular instance of link information to the at least one instance of content, and transmit the at least one instance of content to which the link information is registered to a user terminal. The at least one instance of content may be associated with a right. The right may indicate that registration of link information to the at least one instance of content from a content creator terminal is enabled. Registration of link information to the at least one instance of content may include associating the at least one instance of content with an external network page associated with the link information. A particular instance of link information may be registered to the at least one instance of content based on the right and further based on receiving a request to register the particular instance of link information to the at least one instance of content. The particular instance of link information may be associated with a particular external network page, such that the registering associates the at least one instance of content with the particular external network page. The at least one instance of content to which the link information is registered may be transmitted to a user terminal, such that the user terminal displays the particular external network page in response to user interaction with the at least one instance of content through a user interface of the user terminal.

The user terminal may not display information associated with the particular instance of link information and information associated with the particular external network page on a common display interface with the at least one instance of content.

The processor may be configured to execute the computer-readable instructions to further replace link information preregistered to the at least one instance of content with the particular instance of link information based on a bidding competition.

The processor may be configured to execute the computer-readable instructions to further maintain registration of preregistered link information to the at least one instance of content for a particular period of elapsed time.

The processor may be configured to execute the computer-readable instructions to further receive a plurality of content, extract one or more instances of content from the received content based on the one or more instances of content being associated with the right, identify the at least one instance of content, from the one or more instances of extracted content, as being associated with a particular keyword, the particular keyword being associated with the particular instances of link information, and transmit the identified at least one instance of content to the link registrant terminal.

The processor may be configured to execute the computer-readable instructions to further receive content associated with a designated bidding price range from the content creator terminal in response to receiving a request for registering a plurality of instances of link information to the content.

The processor may be configured to execute the computer-readable instructions to further receive content associated with a right indicating that registration of link information is disabled.

The processor may be configured to execute the computer-readable instructions to further generate charge information and reward information according to a user connection to the particular external network page, based on the user terminal selecting the at least one instance of content to which the link information is registered and displaying the particular external network page based on the selecting.

According to at least one example embodiment, it is possible to reduce or, alternatively, minimize a degradation in a quality of service (QoS) by indiscreet link information present in content by receiving content, each not set with link information, from a plurality of content creators, by receiving link information from a link registrant having only link information, and by registering the link information to at least one of the received content based on a right set to each of the received content, and by providing the content to which the link information is registered.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 7 illustrates an example of a state of content set with a right according to at least one example embodiment;

Figure 1:
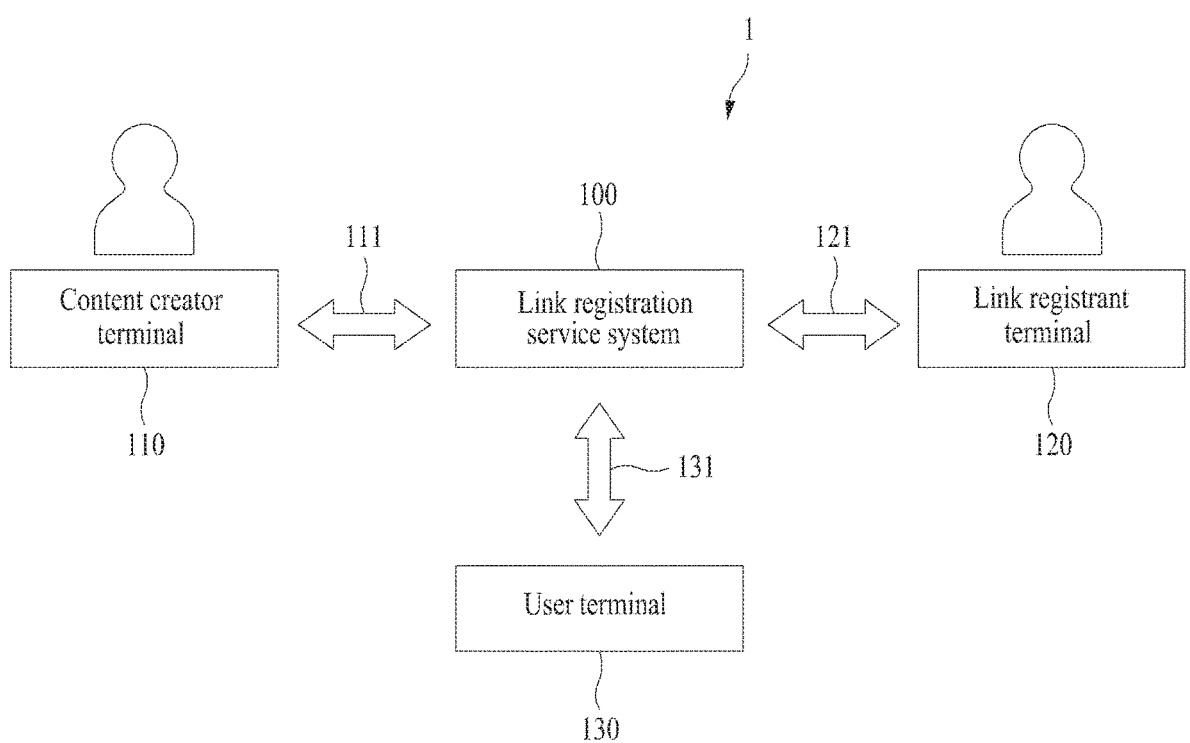
FIG. 1 is a diagram illustrating a relationship between a link registration service system and terminals performing communication according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" "comprising," "includes," and/or "including," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), an application-specific integrated circuit (ASIC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments may be applicable to any type of link information registration service systems that may provide outlink registered to selected content, in response to selecting the content on a webpage provided on the Internet or the mobile Internet. For example, the example embodiments may be applicable to any service fields that provide a landing page registered to clicked content, in response to clicking the content provided at a portal website, a social network service (SNS), a shopping site, and the like. The example embodiments may be employed to limit and/or prevent a degradation in an original quality of service (QoS) by link information at an SNS based on hash tags and content.

The term "content" used herein may inclusively indicate images, videos, games, movies, music videos, music, audios, sound, characters, symbols, etc., as information provided through the Internet or the mobile Internet.

The term "link information" used herein represents outlink. The link information may include a uniform resource locator (URL) for automatically connecting a current webpage to an external page. The term "external page" refers to a webpage, for example, a landing page, that includes detailed information associated with content to which link information is registered and is provided at an external server aside from a link registration service system.

The terms "content creator terminal", "link registrant terminal", and "user terminal" may indicate any type of terminals having a computing processing function, for example, a PC, a smartphone, a tablet, a laptop computer, and the like. Hereinafter, description is made for each of the content creator terminal, the link registrant terminal, and the user terminal, based on a primary role of each terminal.

The term "hash tag" used herein represents a writing about a specific subject by adding a specific word behind a designated symbol. For example, # figure may indicate that this writing is associated with a figure.

FIG. 1 is a diagram illustrating a communication network 1 that includes a relationship between a link registration service system and terminals performing communication according to at least one example embodiment. FIG. 1 illustrates a link registration service system 100, a content creator terminal 110, a link registrant terminal 120, and a user terminal 130. Although FIG. 1 illustrates the content creator terminal 110, the link registrant terminal 120, and the user terminal 130 to be singular, it is only an example. A plurality of content creator terminals 110, a plurality of link registrant terminals 120, and a plurality of user terminals 130 may communicate with the link registration service system 100. One or more of the content creator terminal 110, the link registrant terminal 120, the user terminal 130, and the link registration system 100 may be implemented by one or more computer systems, including one or more of the computer systems 1100 illustrated and described below with reference to FIG. 11.

In FIG. 1, indicators with arrowheads 111, 121, 131 may each represent one or more communication links between two or more separate computer systems. The indicators 111, 121, 131 may indicate that data may be transmitted between the link registration service system 100 and the content creator terminal 110 through communication link 111, the link registrant terminal 120 through communication link 121, and the user terminal 130 through communication link 131 over a wired/wireless network. The communication network 1 may be one or more of a wired communication network and a wireless communication network.

The content creator terminal 110, the link registrant terminal 120, and the user terminal 130 may be, for example, a PC, a smartphone, a tablet, a laptop computer, etc., and may refer to any type of mobile devices capable of connecting to a website/mobile site associated with the link registration service system 100 and/or installing and executing a service exclusive application (hereinafter, a service app). In the example embodiments illustrated in FIG. 1, the content creator terminal 110, the link registrant terminal 120, and/or the user terminal 130 may perform the overall service operation, such as service screen configuration, data input, data transmission and/or reception, data storage, and the like, under control of the website/mobile side and/or the service app.

The content creator terminal 110 may create content, including one or more of an image, a video, some combination thereof, and the like. The content creator terminal 110 may upload the created content to the link registration service system 100 through communication link 111. In at least one example embodiment, The content creator terminal 110 may upload content that does not include any link information to the link registration service system 100 through communication link 111. For example, the content creator terminal 110 may transmit the created content to the link registration service system 100 through a user interface generated by connecting to the website/mobile site associated with the link registration service system 100 through communication link 111, by executing a service application ("service app") installed in the content creator terminal 110.

The link registrant terminal 120 may request the link registration service system 100 to register at least one item of link information with respect to uploaded content. The link registrant terminal 120 may transmit requested link information to the link registration service system 100 through communication link 121. For example, the link registrant terminal 120 may request the link registration service system 100 to register at least one item of link information through a user interface generated by connecting to the website/mobile site associated with the link registration service system 100 through communication link 121 or by executing the service app installed in the link registrant terminal 120. The link registrant terminal 120 may transmit the corresponding link information to the link registration service system 100 through the user interface.

In at least one example embodiment, the link information may include, as outlink, a URL for connecting to a landing page associated with selected content in response to selecting the content to which the link information is registered. A single link registrant terminal 120 may request a plurality of items of link information from system 100 through at least the communication link 121.

The link registration service system 100 may serve as a service platform that provides an SNS to the content creator terminal 110, the link registrant terminal 120, and the user terminal 130 that are clients. In particular, the link registration service system 100 may provide a user interface for user interaction in order to provide a service for registering content, link information, etc., to the content creator terminal 110, the link registrant terminal 120, and the user terminal 130. The link registration service system 100 may be configured as an application form on the user terminal 130 and, without being limited thereto, may be configured to be included in a service platform that provides an SNS and the like in a client-server environment.

The link registration service system 100 may receive content set with a right from the content creator terminal 110, and may receive a request for registering link information and the requested link information from the link registrant terminal 120. The link registration service system 100 may verify the right set to the content, may determine content to recommend to the link registrant terminal 120 among the received content, and may register the link information requested from the link registrant terminal 120 to the content selected at the link registrant terminal 120 from among the recommended content.

For example, the link registration service system 100 may, in response to receiving a request for recommended content from the link registrant terminal 120, provide a selection of content as "recommended content" to the link registrant terminal 120. The link registration service system 100 may provide information associated with the content, including metadata, to the link registrant terminal 120 in addition to, or in alternative of, the content.

The link registration service system 100 may select a limited selection of content received from the content creator terminal 110 as recommended content. The link registration service system 100 may select content as recommended content based on information included in the request for recommended content received from the link registrant terminal 120. For example, the request may specify one or more properties of desired content. Such properties may include metadata of such desired content. The link registration service system 100 may select a limited selection of content that have one or more properties corresponding to the properties specified in the request received from the link registrant terminal 120.

In response to first content being selected at the link registrant terminal 120, the link registration service system 100 may register first link information provided from the link registrant terminal 120 to the first content to enable a connection to an external page, for example, a landing page if the first content is clicked.

As described above, with respect to content uploaded through an SNS, a blog, etc., the link registration service system 100 may serve as a broker that registers link information received from the link registrant terminal 120. The link registrant terminal 120 may register link information associated with a desired landing page to desired content instead of directly creating content. That is, the link registrant terminal 120 may purchase out-landing associated with selecting specific content from the link registration service system 100. Content may be selected at the link registrant terminal 120 based on user interaction with one or more user interfaces of the link registrant terminal 120 to select specific content from a selection of one or more instances of content provided through one or more user interfaces of the link registrant terminal. Such selection of specific content may be referred to herein as "clicking," "touching," etc.

The user terminal 130 may display, on a screen, a webpage (also referred to herein as a network page) that includes one or more instances of content (also referred to herein as "content") registered to the link registration service system 100 by connecting to the website/mobile site (e.g., network site, network page, etc.) associated with the link registration service system 100 or by executing the service app installed in the user terminal 130. In some example embodiments, the network page includes at least some of the link information registered to the content. Such information may be included as metadata associated with one or more of the content and the network page on which the content is displayed. Such information may include network address information (e.g., URL information) associated with one or more particular external network pages corresponding to the link information registered to the content. In at least one example embodiment, in response to the user terminal 130 selecting content to which link information is registered, the screen may be switched to an external page (also referred to herein as an external network page) corresponding to the link information registered to the selected content. Switching the screen to the external page may include accessing the network page through a communication network and displaying the external page on a display interface ("screen") of the user terminal 130. The user terminal 130 may be the content creator terminal 110 or the link registrant terminal 120, or may be any terminal that connects to the website/mobile site associated with the link registration service system 100 or executes the service app.

In at least one example embodiment, the user terminal 130 may display a webpage based on accessing a communication network. Such accessing may include accessing system 100 through link 131. Based on user-initiated selection of content included in a webpage, where link information may be registered to the content, a signal indicating such a selection may be transmitted to the system 100 through link 131. In response to said signal being received at system 100, the system 100 may transmit a command to the user terminal 130 to access a particular external webpage, through a communication network, where the external webpage corresponds to the link information registered to the selected content. The system 100 may store a database including an array of relationships between external webpages and link information registered to content.

In at least one example embodiment, information identifying the associated external network page (e.g., "webpage") is provided ("transmitted") to the user terminal 130 from the link registration service system with the displayed content. Such information may be included with the link registration information that is registered to the content. The information may include network address information associated with the external network page (e.g., a URL). The information may be included in metadata of the content. The system 100 may provide such information in such a webpage based on receiving a signal from the user terminal 130 to access the webpage.

If and/or when the user terminal 130 receives data that may be processed at the user terminal 130 to display the webpage, the user terminal 130 may have already received external webpage information indicating the external page corresponding to the link information registered to content on the webpage. In response to a selection of the content on the webpage, the user terminal 130 may access the external webpage through a communication network.

In at least one example embodiment, the link registration service system 100 may enable creator control of associations ("connections") between content and external network pages according to link information registrations. Based on selectively registering link information to content based on the one or more rights set to the content at the content creator terminal 110, the link registration service system 100 may enable content creator control over how and whether created content is associated with particular network pages (e.g., webpages, Internet pages, etc.). Thus the link registration service system 100 enables at least some content creator control over how and whether network communications involving the content are implemented, thereby improving control over content usage with regard to network pages in a communication network.

In at least one example embodiment, the link registration service system 100 may enable content association with one or more particular network pages though link information registration, such that interacts with displayed instances of content at a user terminal results in access and display of the one or more particular network pages. Such association of content with one or more network pages, through registration of link information to the content, may improve access to information through communication networks. For example, where an instance of content (e.g., an image) is a representation of a product, and an particular network page is a product information page that includes information associated with the represented product, interfaces for purchase of the product, some combination thereof, or the like, the link registration service system can enable access to the relevant information, can enable interactions relevant to the content (e.g., product purchase), etc. through enabling associations between the content and the one or more particular network pages. Because a user terminal 130 may display such particular network pages in response to interaction with the content (e.g., "clicking" on the content based on user interaction with a user interface of the user terminal 130), the content-relevant information included in the particular network page may be displayed to a user independently of receiving a user-initiated command to search for network pages, content, etc. that are relevant to the content displayed at the user terminal 130.

Furthermore, because the user terminal 130 may access the associated network page directly based on the association (e.g., via accessing the network page based on a network address, URL, etc. associated with the content based on the link information registration), the user terminal 130 may refrain from conducting a network search (e.g., Internet search) for information related to the content and then selecting one or more network pages from search results, where the particular associated network may be absent from such results or may not be the first result. As a result, user terminal operations and/or communication network operations (e.g., computing and/or network communication operations) may be simplified.

Computing and/or network communication operations may be simplified based on the link registration service system 100 registering link information to content and providing ("transmitting) the content with link information registered thereto with link information to the user terminal 130. Thus, the amount of computing resources (e.g., processor resources, memory resources, etc.) associated with accessing network pages associated with the displayed content by the user terminal 130 may be reduced. Thus, operations (and thus functionality) of one or more computer systems implementing one or more of the user terminal 130 and one or more communication networks through which the one or more network pages may be accessed may be improved through reducing the resource load of accessing network pages associated with displayed content.

In addition, because an associated network page may be accessed and displayed based on interaction with content displayed at the user terminal 130, user interfaces with the user terminal 130 by a user may be improved. The user may be provided a network page associated with the content, independently of the user interacting with a user interface to input a command to search for network pages related to the content, review search results, select a result, etc. Thus, the graphical user interface experience provided by a user terminal 130 may be simplified, and thus improved, based on the link registration service system 100 registering link information to content and providing the content with link information to the user terminal 130.

Figure 2:
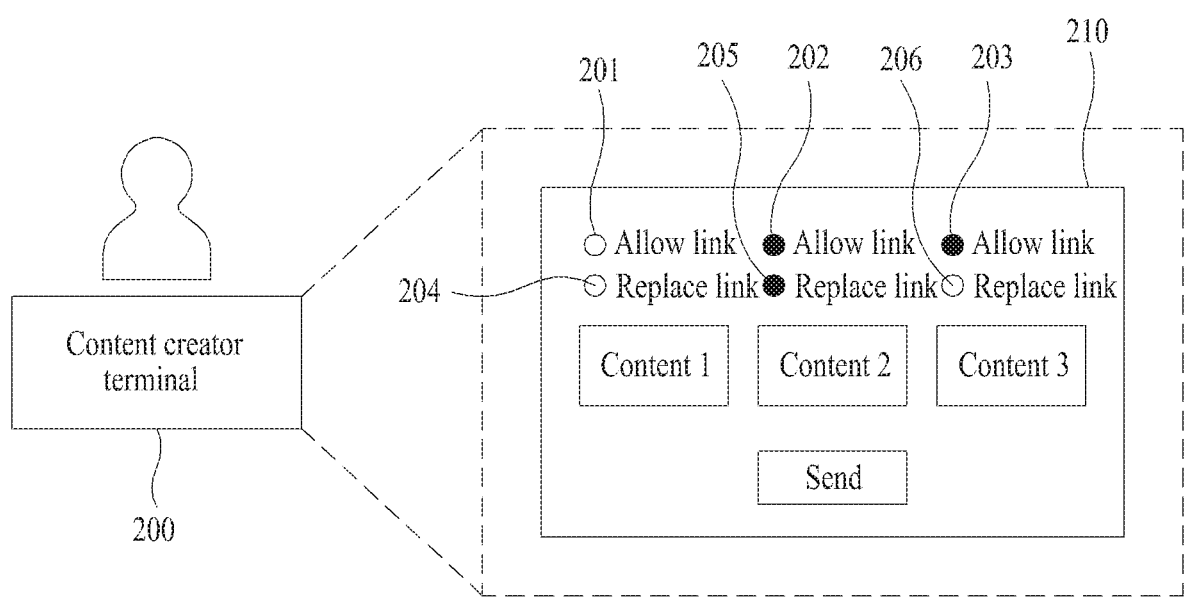
FIG. 2 is a block diagram illustrating an example of content created at a content creator terminal according to at least one example embodiment.

FIG. 2 illustrates an example of content created at a content creator terminal 200 according to at least one example embodiment. The content creator terminal 200 may be included in the content creator terminal 110 illustrated in FIG. 1.

The content creator terminal 200 may create one or more instances of content, such as images, videos, music videos, and the like. The content creator terminal 200 may set, to the created content, a right indicating whether to allow ("enable") registration of link information of another terminal, for example, a link registrant terminal and whether to replace the registered link information. Setting a right to content may also be referred to as associating the right with the content, associating the content with the right, some combination thereof, or the like. Information indicating a right that is "set" to content may be included within metadata associated with the content.

For example, the content creator terminal 200 may create first content, second content, and third content, and may also create N content, where N may be a positive integer. In at least one example embodiment, to transmit the content 1, 2, and 3 to the link registration service system 100, the content creator terminal 200 may set a right to corresponding content based on display information indicating whether to allow ("enable") registration of link information and display information indicating whether to allow ("enable") replacement of link information.

The terminal 200 may display a display interface 210, also referred to herein as a content upload screen 210, on a user interface of the terminal 200. In at least one example embodiment, the terminal 200 may enable user-initiated selections through user interaction with one or more elements of the display interface 210. For example, the display interface 210 may be displayed on an interactive touch-screen display, such that a user may provide a user-initiated selection, command, etc. based on touching a portion of the display that shows one or more display icons associated with said selections, commands, etc.

In an example of allowing ("enabling") registration of link information, a right allowing ("enabling") the registration of link information to content associated with the right may be set to the second content and the third content in response to user-initiated selection of display information ("display interface icon," "icon," etc.) 202 of the second content and display information 203 of the third content on a content upload screen 210 of the content creator terminal 200. Icon 202 may be associated with a command to set a particular right to the second content, where the particular right is a right allowing the registration of link information to content associated with the right. Icon 203 may be associated with a command to set a particular right to the third content, where the particular right is a right allowing the registration of link information to content associated with the right. Since display information 201 of the first content is not selected, a right disallowing ("disabling") the registration of link information may be set to the first content. The content creator terminal 200 may also set ("associate," "assign," etc.), to corresponding content, information indicating whether to replace the registered link information. For example, in response to content creator-initiated selection of display information 205 of the second content, the content creator terminal 200 may set, to the second content, a right allowing that the link information registered to the second content is replaceable through a bidding competition and the like. For example, in response to content creator-initiated selection of the display information 205 of the second content, the content creator terminal 200 may set a right allowing replacement of the link information registered to the second content through a bidding competition. A content creator may include a user of the content creator terminal 200. In response to an absence of a selection of display information 204 of the first content and display information 206 of the third content, the content creator terminal 200 may set, to the first content and third content, a right disallowing replacement of link information registered thereto.

That is, if a content creator does not desire created content to be used for other purposes and desires the content to be provided in an original state, the content creator terminal 200 of the content creator may set a right disallowing registration of link information and replacement of the link information as shown in FIG. 2 with regard to the first content. As shown in FIG. 2 with regard to the second content, the content creator terminal 200 may set a right allowing registration of link information uploaded from another terminal and replacement of the link information with link information uploaded from still another terminal. As shown in FIG. 2 with regard to the third content, the content creator terminal 200 may set a right allowing registration of link information and disallowing replacement of the link information. In this manner, an exclusive right about the third content may be granted to a specific user.

Figure 3:
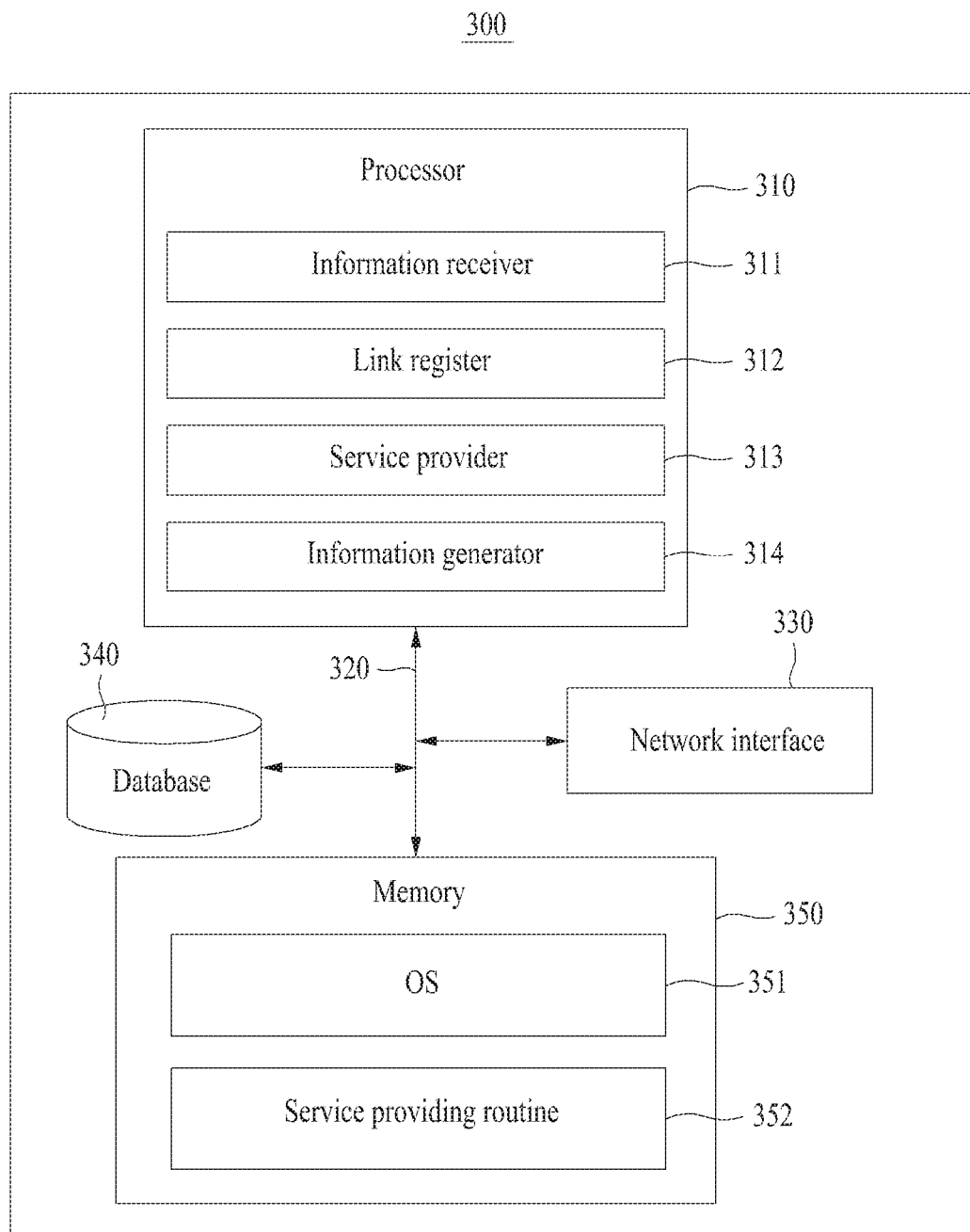
FIG. 3 is a block diagram illustrating a configuration of a link registration service system according to at least one example embodiment.
Figure 4:
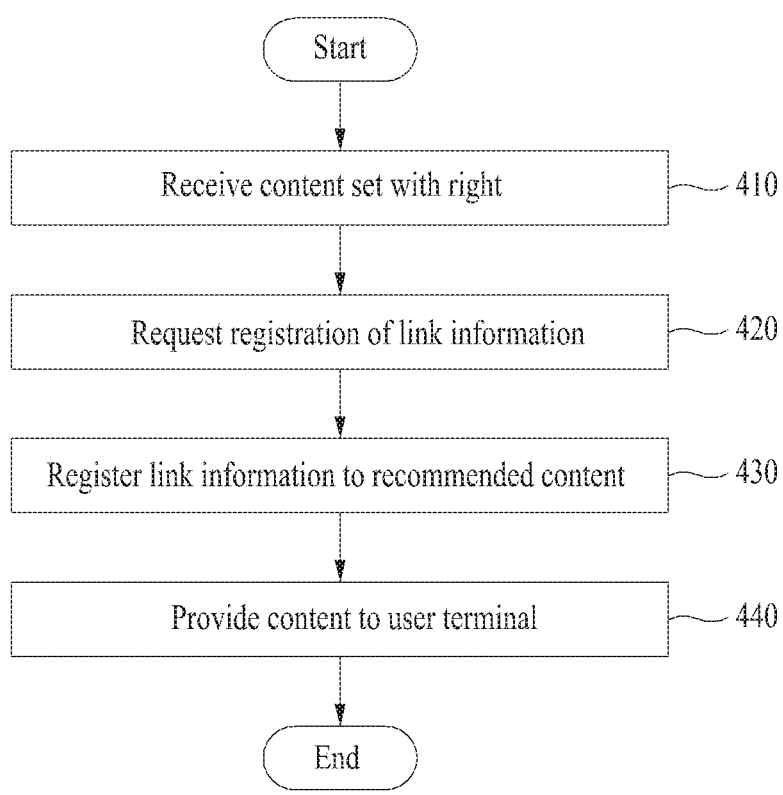
FIG. 4 is a flowchart illustrating a link registration service method according to at least one example embodiment.

FIG. 3 is a block diagram illustrating a configuration of a link registration service system 300 according to at least one example embodiment, and FIG. 4 is a flowchart illustrating a link registration service method according to at least one example embodiment. The link registration service system 300 may be included in the link registration service system 100 illustrated in FIG. 1.

Referring to FIG. 3, a link registration service system 300 includes a processor 310; a bus 320; a network interface 330; a database 340; and a memory 350. In at least one example embodiment, the memory 350 includes an operating system (OS) 351 and a service providing routine 352. The processor 310 may include an information receiver 311, a link register 312, a service provider 313, and an information generator 314. In some example embodiments, the processor 310 may be a hardware processor such as central processing unit (CPU), a multi-processor, a distributed processing system, an application specific integrated circuit (ASIC), and/or a suitable hardware processing unit.

In some example embodiments, the processor 310 may be a hardware processor such as central processing unit (CPU), a multi-processor, a distributed processing system, an application specific integrated circuit (ASIC), and/or a suitable hardware processing unit, that when executing instructions according to the firmware or software configures the processor 310 as a special purpose processor for controlling one or more operations of the link registration service system 300.

According to at least some example embodiments, the link registration service system 300 may include a greater or lesser number of constituent elements than the number of constituent elements shown in FIG. 3. For example, the link registration service system 300 may include other constituent elements such as a display, a transceiver, etc.

The memory 350 may include a permanent mass storage device, such as random access memory (RAM), read only memory (ROM), a disk drive, etc., as a computer-readable storage medium. Also, program code or codes (e.g., computer-readable instructions) for the OS 351 and the service providing routine 352 may be stored in the memory 350. Such software constituent elements may be loaded from another computer-readable storage medium separate from the memory 350 using a drive mechanism (not shown). The other computer-readable storage medium may include, for example, a floppy drive, a disc, a tape, a DVD/CD-ROM drive, a memory card, etc. Software constituent elements may be loaded to the memory 3540 through the network interface 330 instead of, or in addition to, the computer-readable storage medium.

The bus 320 enables communication and data transmission between the constituent elements of the link registration service system 300. The bus 320 may be configured using a high-speed serial bus, a parallel bus, a storage area network (SAN), and/or another appropriate communication technology.

The network interface 330 may be a computer hardware constituent element for connecting the link registration service system 300 to a computer network. The network interface 330 may be a network interface card (NIC), such as an Ethernet card, an optical transceiver, a wireless frequency transceiver, a combination thereof, or a different type of device capable of transmitting and receiving information. Other examples of the network interface 330 may be a wireless device including mobile computing devices, Bluetooth within a universal serial bus (USB), 3rd generation (3G), 4th generation (4G), 5th generation (5G), wireless fidelity (WiFi), and the like. In at least some example embodiments, the link registration service system 300 may use the network interface 330 to wirelessly communicate with an external device, such as a server, a mobile phone, a network computing device, and the like. The network interface 330 may connect the link registration service system 300 to a computer network through a wireless and/or wired connection.

The database 340 may match content set with a right to an ID of the content creator terminal 110 having uploaded the content and thereby may store and maintain the matched content. The database 340 may match link information to the link registrant terminal 120 having uploaded the link information and thereby may store and maintain the matched link information. In response to registering link information to specific content, the database 340 may match identification information of the link information to identification information of the registered specific content and thereby may store and manage the link information. In at least one example embodiment, a plurality of items ("instances") of link information may be registered to a single instance of content.

Although FIG. 3 illustrates that the database 340 is included as part of the link registration service system 300, the database 340 may be included in the user terminal 130 or may be included in all of the link registration service system 300 and the user terminal 130. Alternatively, the database 340 may be present as an external database configured on a system separate from the link registration service system 300.

Still referring to FIG. 3, the processor 310 may be configured to process computer-readable instructions of a computer program by performing basic arithmetic operations, logic operations, and/or input/output operations of the link registration service system 300. The computer-readable instructions may be provided from the memory 350 and/or the network interface 330 to the processor 310 through the bus 320. The processor 310 may be configured to execute a program code to cause the processor 310 to perform functions described herein with regard to the information receiver 311, the link register 312, the service provider 313, and the information generator 314. The program code may be stored in a storage device, such as the memory 350.

Figure 6:
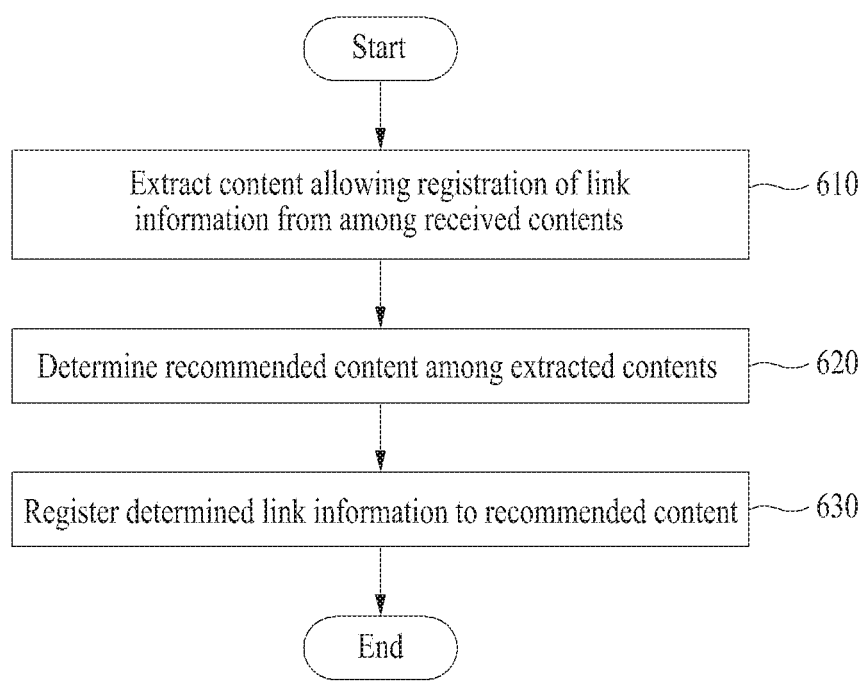
FIG. 6 is a flowchart illustrating an operation of determining recommended content based on link information registered to a link registration service system according to at least one example embodiment.
Figure 10:
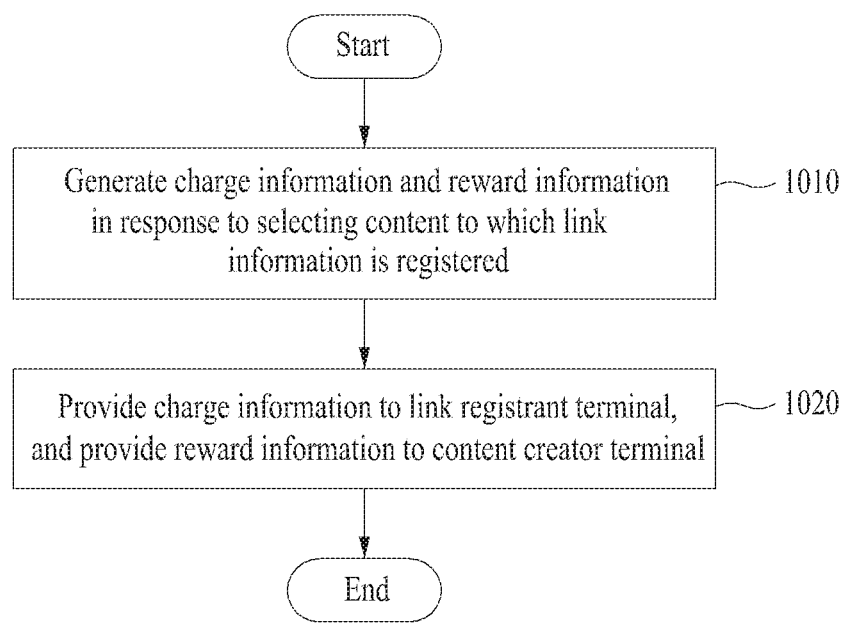
FIG. 10 is a flowchart illustrating an operation of generating charge information and reward information in response to registering link information to content according to at least one example embodiment.

At least some of the link registration service system 300, including the information receiver 311, the link register 312, the service provider 313, and the information generator 314 may be configured to perform operations 410 through 440 of FIG. 4, operations 610 through 640 of FIG. 6, and operations 1010 and 1020 of FIG. 10. The processor 310 may be interoperable with the memory to perform one or more of the above operations 410-440 and 610-640.

In operation 410, at least some of the link registration service system 300 (e.g., the information receiver 311) may receive at least one instance of content set with a right indicating whether to allow registration of link information from the content creator terminal 110. In at least one example embodiment, in the received content, only the right allowing registration of link information may be set and no link information may be registered.

In operation 420, at least some of the link registration service system 300 (e.g., the information receiver 311) may receive a request for registering at least one piece ("instance") of link information from the link registrant terminal 120, and may receive the requested link information. In at least one example embodiment, at least some of the link registration service system 300 (e.g., the information receiver 311) may receive only link information that includes URL information from the link registrant terminal 120, and may not receive content, such as an image, a video, music, and the like.

For example, in response to a click on first content through the user terminal 130, at least some of the link registration service system 300 (e.g., the information receiver 311) may receive outlink including URL information for connecting the user terminal 130 to an external page, for example, a landing page. In at least one example embodiment, in response to a link registrant requesting registration of each of a plurality of items of link information in order to register different items of link information for the respective objects included in single content, the link register 312 may also register the requested plurality of items of link information to the single content.

In operation 430, at least some of the link registration service system 300 (e.g., the link register 312) may register the link information received from the link registrant terminal 120 to the content created at the content creator terminal 110.

For example, at least some of the link registration service system 300 (e.g., the link register 312) may determine content to register link information requested from the link registrant terminal 120, among the received content. At least some of the link registration service system 300 (e.g., the link register 312) may recommend the determined content to the link registrant terminal 120. In at least one example embodiment, at least some of the link registration service system 300 (e.g., the link register 312) may determine one or more instances of content as recommended content and may register the link information to content selected at the link registrant terminal 120 from among the recommended content.

In operation 440, at least some of the link registration service system 300 (e.g., the service provider 313) may provide the user terminal 130 with content to which link information is registered and content to which link information is not registered based on a set right. For example, content uploaded from the content creator terminal 110 to the link registration service system 300 may be displayed on a screen of the user terminal 130. The content may be content to which link information is registered and may be content to which link information is not registered based on a set right. In at least one example embodiment, only content may be displayed on the screen of the user terminal 130. Information associated with link information registered to the content or information associated with an external page may not be displayed on the screen of the user terminal 130. Such information may be provided to the user terminal 130 with the content, and the information may be stored at the user terminal. In some example embodiments, such information may be included as metadata of one or more of the content provided to the user terminal 130 and/or a network page that includes the content and is provided to the user terminal 130.

Figure 5:
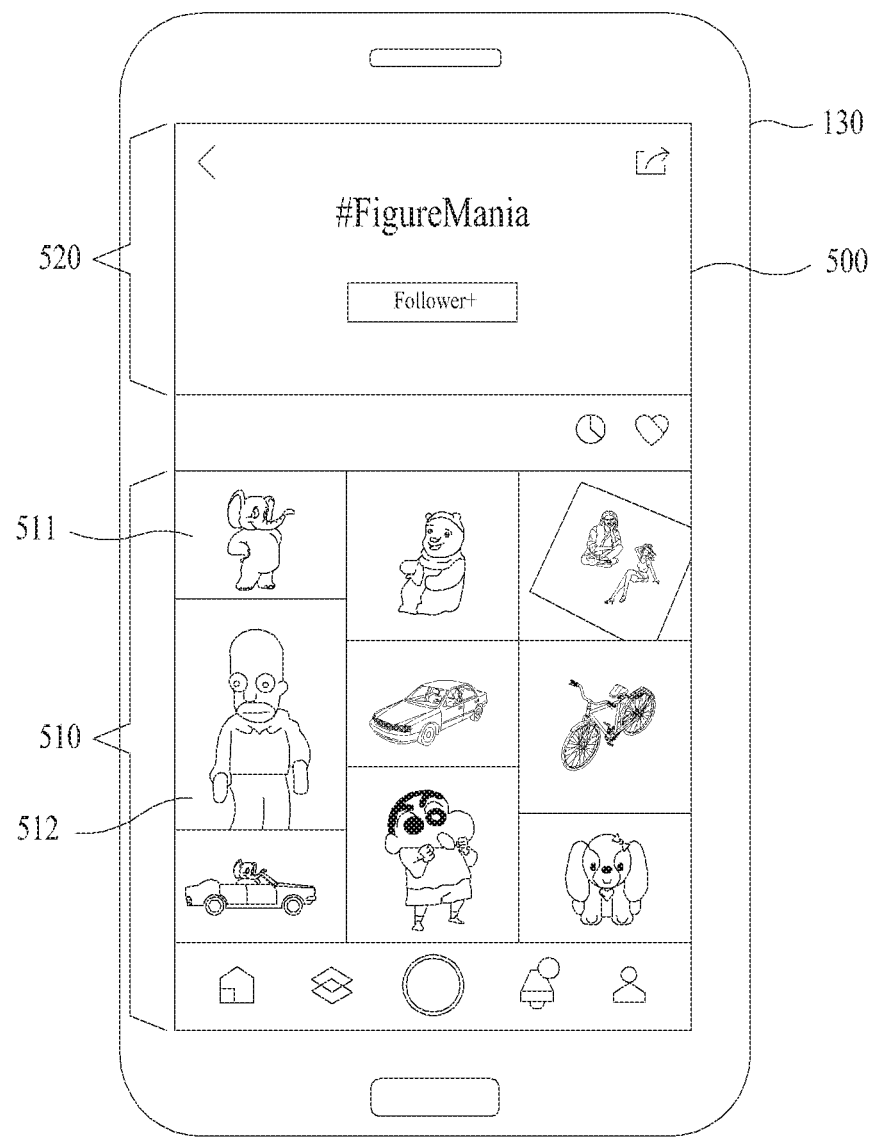
FIG. 5 illustrates an example of a screen of a user terminal displaying content according to at least one example embodiment.

FIG. 5 illustrates an example of a screen 500 of a user terminal 130 displaying content according to at least one example embodiment.

Referring to FIG. 5, a display interface 500 (also referred to herein as a screen 500) of a user terminal 130 may include a content area 510 that may display content to which link information is registered or not registered based on a right set at the content creator terminal and an area 520 for hash information indicating a subject of the content.

Although link information is registered to corresponding content, only the content may be displayed on the content area 510 and information associated with the link information or information associated with an external page may not be displayed on the content area 510. That is, content to which link information is registered, content to which link information is not registered, and/or unique information, for example, an image, of content may be displayed on the content area 510. Thus, the user may not visually verify whether link information is registered or not registered to corresponding content until the user "clicks" on the content displayed on the content area 510 based on user interaction with one or more user interfaces of terminal 130.

In an example in which first link information is registered to first content 511 and no link information is registered to second content 512, the first content 511 and the second content 512, for example, a first image and a second image, created at the content creator terminal 110 may be displayed on the screen 500. The link information of the first content 511 or information, for example, brief information about content of an external page, associated with the external page connected in response to a click on the first content 511 may not be displayed on the screen 500. Accordingly, when the first content 511 is selected at the user terminal 130, based on user interaction with one or more user interfaces of terminal 130, and the screen 500 is switched to display the external page, based on the terminal 130 accessing data associated with the external page via a communication network, the user may verify that the link information is set to the first content 511. If the second content 512 is selected at the user terminal 130, the screen 500 may be maintained without being switched.

As described above, since only content is displayed and link information registered to the content is not displayed, it is possible to reduce a degradation in a QoS of the content, for example, an image defamation that may occur by displaying link information on an image.

FIG. 6 is a flowchart illustrating an operation of determining recommended content based on link information registered to a link registration service system according to at least one example embodiment. As described above, the operation may be implemented by some or all of a link registration service system, including one or more of the system 300 illustrated in FIG. 3.

In operation 610, at least some of the link registration service system 300 (e.g., the link register 312) may extract content allowing registration of link information based on a right set to the content, from among content received from the content creator terminal 110.

In operation 620, at least some of the link registration service system 300 (e.g., the link register 312) may determine recommended content based on the number of followers, a click through ratio (CTR), the number of comments, for example, texts, images, etc., and a keyword associated with link information, among the extracted content.

For example, the link registrant terminal 120 may input attribute information, for example, a keyword "figure", of content into a search box on a screen provided for registering link information, and may transmit the link information to the link registration service system 300. In at least one example embodiment, at least some of the link registration service system 300 (e.g., the information receiver 311) may receive the link information together with the attribute information of the content, for example, "figure". The at least some of the link registration service system 300 (e.g., the link register 312) may determine, as recommended content, content including attribute information corresponding to "figure" among the extracted content. In at least one example embodiment, at least some of the link registration service system 300 (e.g., the link register 312) may determine the recommended content corresponding to the attribute information based on a hash tag of the content received together with the content from the content creator terminal 110. For example, the at least some of the link registration service system 300 (e.g., the link register 312) may determine content including "figure" in the hash tag as the recommended content.

The at least some of the link registration service system 300 (e.g., the link register 312) may provide the determined recommended content to the link registrant terminal 120. The link registrant terminal 120 may display the recommended content on a screen thereof.

In operation 630, at least some of the link registration service system 300 (e.g., the link register 312) may register the requested link information to content selected at the link registrant terminal 120 from among the recommended content.

In an example in which first content, second content, third content, and fourth content are provided as recommended content to the link registrant terminal 120, and the first content is selected from among the first content, the second content, the third content, and the fourth content, as content to which link information is to be registered, the link register 312 may register the first link information to the first content. For example, at least some of the link registration service system 300 (e.g., the link register 312) may register the first link information to the first content by matching and storing identification information of the first link information and identification information of the selected first content.

In at least one example embodiment, if the number of determined recommended content is greater than or equal to a threshold value and thus may not be displayed on a single screen, at least some of the link registration service system 300 (e.g., the link register 312) may filter the recommended content based on the number of followers, a CTR, and the number of comments for each of the recommended instances of content. For example, at least some of the link registration service system 300 (e.g., the link register 312) may sort the recommended content in descending order of the number of followers or a CTR, may extract a desired or, alternatively, predetermined number of recommended content from among the sorted recommended content, and may provide the extracted recommended content to the link registrant terminal 120. The at least some of the link registration service system 300 (e.g., the link register 312) may register the link information to content selected at the link registrant terminal 120 from among the provided recommended content. In at least one example embodiment, the at least some of the link registration service system 300 (e.g., the link register 312) may filter the recommended content by combining at least one of the number of followers, a CTR, and the number of comments, etc., and may also filter the recommended content by applying a different weight to each of the number of followers, the CTR, and the number of comments, etc.

In at least one example embodiment, link information registered to content may be replaced with another link information based on a set right.

FIG. 7 illustrates an example of a state of content set with a right according to at least one example embodiment. FIG. 7 illustrates an array of information associated with one or more instances of content. The array may be stored at one or more computer systems included in the communication network 1, including the system 300.

Referring to FIG. 7, second content and fourth content are set with a right allowing replacement of link information, and first content and third content are set with a right disallowing replacement of link information.

Since the right disallowing registration of link information is set to the first content, registered link information may be absent in the first content.

Since the right allowing registration of link information is set to the third content, link information requested to be registered from the link registrant terminal 120 may have been registered to the third content in the link registration service system 300. Since the right disallowing replacement of link information is set to the third content, the link register 312 may not replace the registered link information although another link registrant terminal requests registration of link information with respect to the third content. As described above, a specific terminal, for example, the link registrant terminal 120 may have an exclusive right to use the third content.

In at least one example embodiment, a time limit for a right to use the third content may be present. For example, link information registered to the third content may not be replaced only during a preset period of time, such as one hour, 12 hours, one week, etc. If the preset period of time is elapsed, the link register 312 may grant the exclusive right to another link registrant terminal that requests registration of link information with respect to the third content. That is, the link register 312 may guarantee a link so that link information registered to the third content may be maintained without being replaced by a particular period of elapsed time (also referred to herein as a "reference time"), and may replace the link information registered to the third content with another link information requested from another link registrant terminal if the reference time is elapsed. In at least one example embodiment, the reference time may be input and set from the link registrant terminal 120.

In at least one example embodiment, the link register 312 may grant the exclusive right to use the third content based on a bidding competition. For example, the link register 312 may grant the exclusive right to use the third content to a link registrant terminal having suggested a highest bidding price with respect to link registrant terminals having requested registering link information to the third content. Accordingly, the link register 312 may replace the link information registered to the third content with link information requested from the link registrant terminal being granted with the exclusive right.

Referring back to FIG. 7, the second content is content set with a right allowing replacement of link information and in which registered link information is absent. That is, the second content may indicate content allowing replacement of registered link information in real time through a bidding competition.

In an example in which a plurality of link registrant terminals request registering corresponding link information to the second content and a first terminal suggests highest bidding price, the link register 312 may register, to the second content, first link information requested from the first terminal having made a bid at the highest bidding price among the plurality of link registrant terminals. In at least one example embodiment, if a second terminal suggests higher bidding price than the first terminal, the link register 312 may replace the first link information registered to the second content with second link information of which registration is requested from the second terminal and may register the second link information to the second content. In the same manner, the link register 312 may replace link information registered to the second content through a real-time bidding competition.

The fourth content is content that includes registered link information and allowing ("enabling") the registered link information to be replaced with link information requested from another link registrant terminal through a real-time bidding competition. This process is same as or similar to a process of performing the real-time bidding competition in a state in which the link information is already registered to the second content. Thus, a repeated description is omitted.

Although a right to perform a real-time bidding competition is set as in the second content and the fourth content, the link register 312 may surely maintain the registered link information during a preset period of time. For example, the link register 312 may maintain link information registered to the second content and the fourth content without replacing the link information during a preset period of time, such as 5 minutes, 10 minutes, 20 minutes, 30 minutes, etc. The period of time may be set in advance to be less than the reference time applied to the third content. In at least one example embodiment, the t period of time may be set by the content creator terminal 110 or the link registration service system 300.

Meanwhile, the content creator terminal 110 may set a bidding price range to be applied for a bidding competition with respect to content set with a right allowing ("enabling") registration of link information. The content creator terminal 110 may transmit the set bidding price range to the link registration service system 300.

In an example of determining link information to be registered through a bidding competition, such as in the second content and the fourth content, the link register 312 may receive bidding price for content from link registrant terminals based on the bidding price range set to the second content and the fourth content. The bidding price range may include lowest bidding price and highest bidding price, and may include only the lowest bidding price. As described above, once the bidding price range is set, the link register 312 may provide the bidding price range to each of link registrant terminals having requested registering link information to specific content. The link register 312 may determine link information to be registered to corresponding content based on the bidding price from the respective link registrant terminals.

Figure 8A:
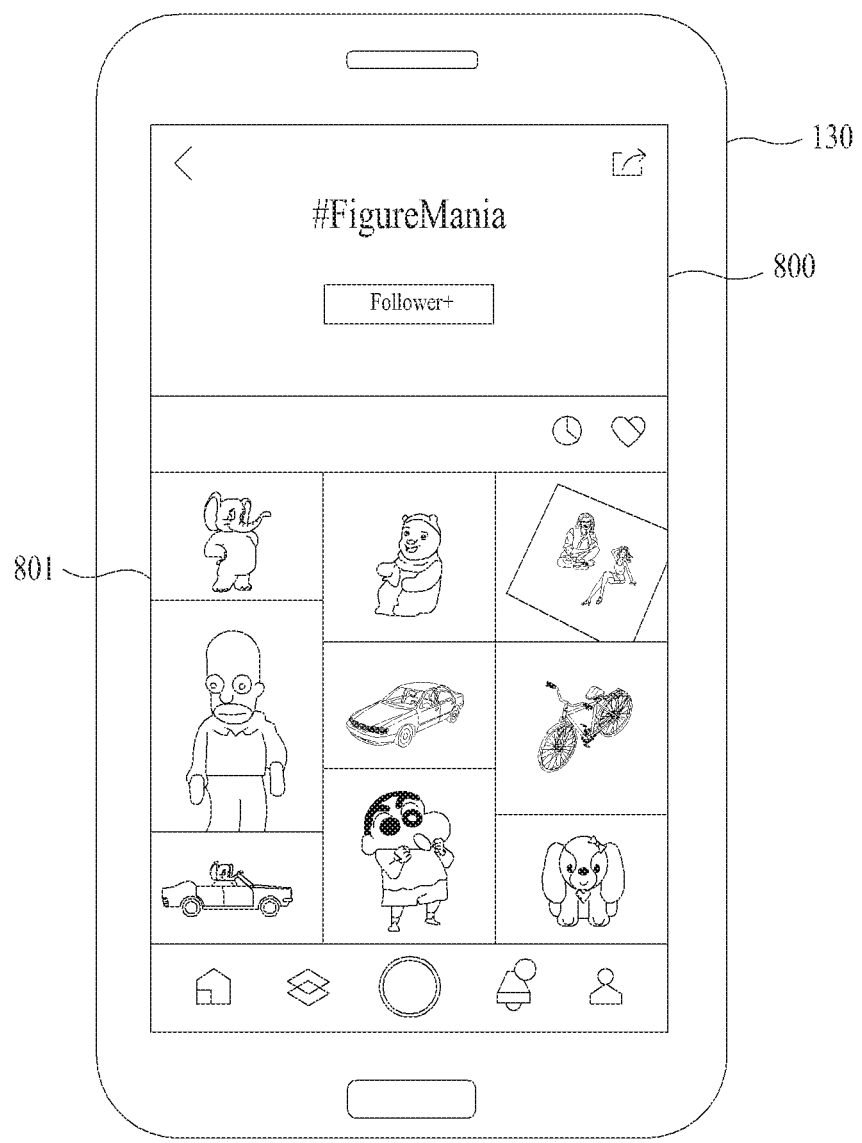
FIG. 8A and FIG. 8B illustrate connecting to an external page through link information registered to content according to at least one example embodiment.
Figure 8B:
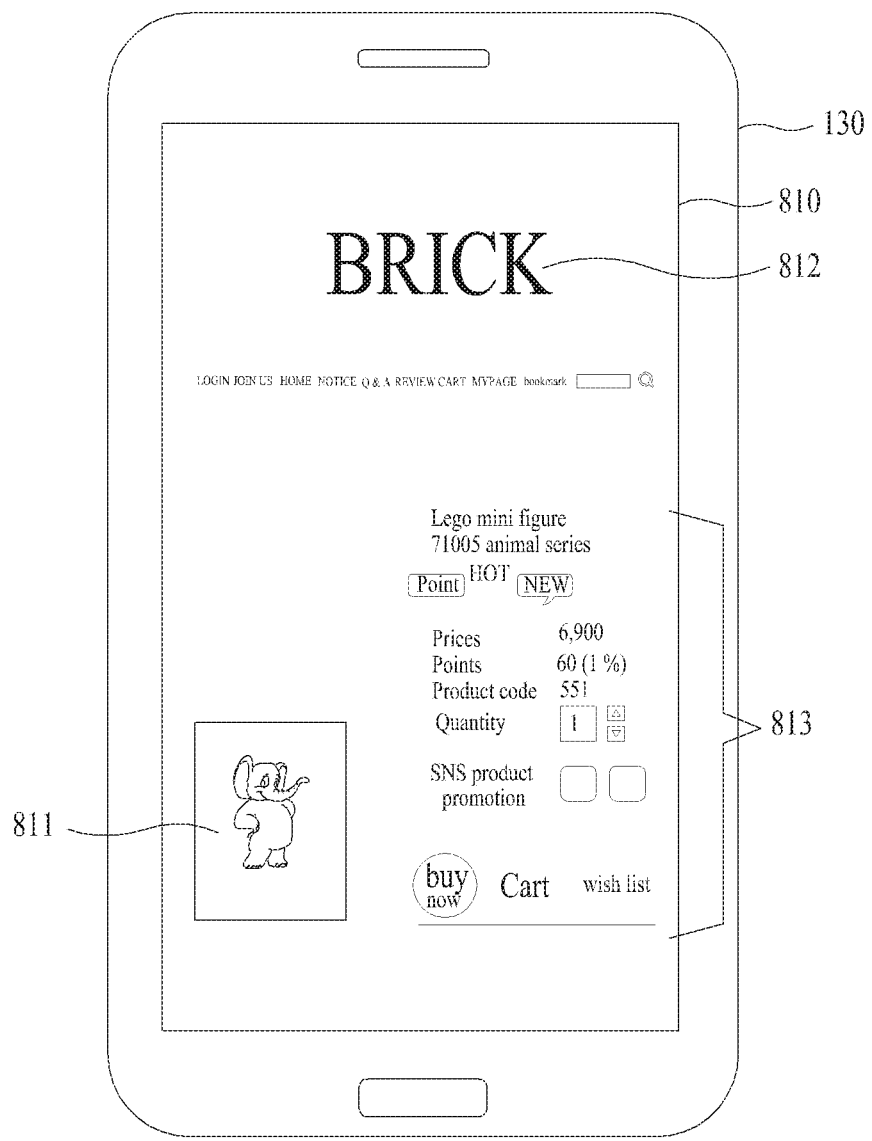

FIG. 8A and FIG. 8B illustrate connecting to an external page through link information registered to content according to at least one example embodiment.

Referring to FIG. 8A and FIG. 8B, content to which link information is registered and/or content to which link information is not registered may be displayed on a screen 800 of the user terminal 130. In at least one example embodiment, in response to a user of the user terminal 130 selecting first content 801 to which link information is registered, through interaction with one or more user interface of the user terminal 130, the user terminal 130 may transmit identification information of the selected first content 801 to the link registration service system 300. The link registration service system 300 may search a database for identification information of first link information that matches the identification information of the first content 1 801, and may transmit the first link information corresponding to the retrieved identification information to the user terminal 130.

For example, the user terminal 130 may receive a URL included in the first link information, and may access an external page 810 corresponding to the URL and switch the screen 800 to display the external page 810 corresponding to the URL based on the received URL, and may display the external page 810. For example, as shown in FIGS. 8A-B, the external page 810 may be a landing page that provides detailed information associated with the first content 801 of an elephant figure image. The external page 810 may include an area 811 for displaying an image that is the same or similar to the elephant figure image 801 displayed on the screen 800, an area 811 for displaying seller information, for example, a website name and the like, about a seller selling an elephant figure, and an area 813 for displaying purchase information associated with purchase of the elephant figure.

Figure 9:
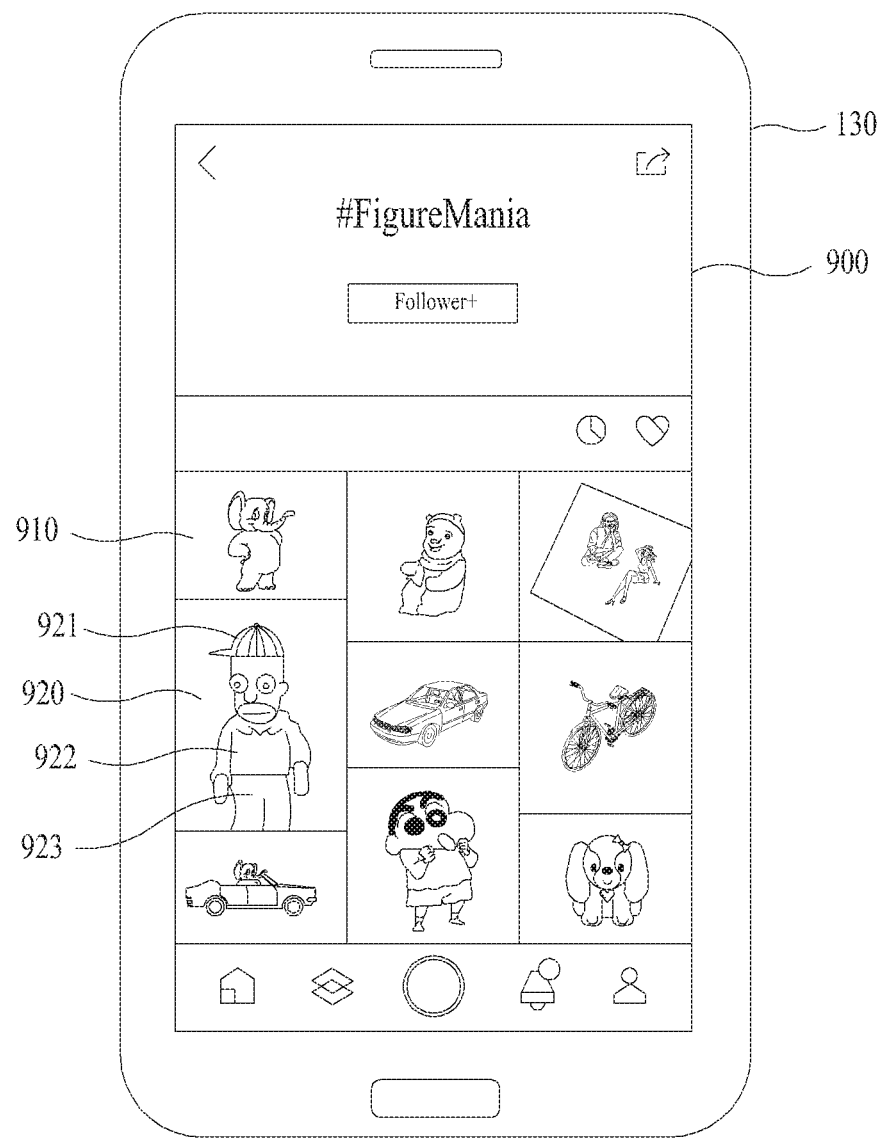
FIG. 9 illustrates an example of a plurality of items of link information registered to single content according to at least one example embodiment.

FIG. 9 illustrates an example of a plurality of items of link information registered to single content according to at least one example embodiment.

Referring to FIG. 9, a single item of link information may be registered to first content 910 and different items of link information may be registered to second content 920 among multiple instances of content displayed on a screen 900 of a user terminal 130. In at least one example embodiment, different items ("instances") of link information may be registered to the respective objects included in the second content 920.

For example, link information associated with a cap may be registered to a first object 921, link information associated with a T-shirt may be registered to a second object 922, and link information associated with pants may be registered to a third object 923. In at least one example embodiment, the link information registered to the first object 921, the second object 922, and the third object 923 may have been received from the same link registrant terminal, or may have been received from different link registrant terminals, respectively.

That is, the same selling site and different landing pages may correspond to the link information registered to the first object 921, the second object 922, and the third object 923. Also, selling sites corresponding to the link information registered to the first object 921, the second object 922, and the third object 923 may differ from each another.

FIG. 10 is a flowchart illustrating an operation of generating charge information and reward information in response to registering link information to content according to at least one example embodiment. The operation may be implemented by some or all of a link registration service system, including one or more of the system 300 illustrated in FIG. 3.

In operation 1010, in response to selecting content to which link information is registered from among content displayed on a screen of the user terminal 130, at least some of the link registration service system 300 (e.g., the information generator 314) may generate charge information for redirecting a user to an external page corresponding to the link information through the content.

For example, the at least some of the link registration service system 300 (e.g., information generator 314) may generate charge information for charging high advertising cost according to an increase in the number of users redirected to the external page through the content. In addition, at least some of the link registration service system 300 (e.g., the information generator 314) may generate the charge information by applying a weight based on whether the user has made a purchase at the external page redirected through the content, whether the redirected user terminal has joined the external page, whether an application associated with the external page is installed, and the like.

Every time content corresponding to the selected link information is selected, at least some of the link registration service system 300 (e.g., the information generator 314) may generate reward information for the content creator terminal 110 having created the content. For example, as a reward for redirecting a user to an external page through the content, at least some of the link registration service system 300 (e.g., the information generator 314) may generate reward information, such as mileage saving, point saving, cyber money, a coupon, a physical gift such as a gift card, etc., available at service apps associated with the link registration service system 300. The reward information may be generated based on a preset ratio of charge information to be charged to the link registrant terminal 110. For example, if charge information is 10, at least some of the link registration service system 300 (e.g., the information generator 314) may generate the reward information so that a reward is made at a ratio of 1%, etc., of the charge information.

In operation 1020, at least some of the link registration service system 300 (e.g., the information generator 314) may provide the generated charge information to the link registrant terminal 120, and may provide the generated reward information to the content creator terminal 110.

For example, in response to the user terminal 130 selecting content to which link information is registered, at least some of the link registration service system 300 (e.g., the link register 312) may receive identification information of the selected content from the user terminal 130. The at least some of the link registration service system 300 (e.g., the link register 312) may search a database for identification information of link information that matches the received identification information of the content. In at least one example embodiment, at least some of the link registration service system 300 (e.g., the information generator 314) may search the database for an ID of the link registrant terminal 120 that matches the found identification information of the link information, and may search the database for an ID of the content creator terminal 110 that matches the received identification information of content. At least some of the link registration service system 300 (e.g., the information creator 314) may provide the generated charge information to the link registrant terminal 120 based on the ID of the link registrant terminal 120, and may provide the generated reward information to the content creator terminal 110 based on the ID of the content creator terminal 110.

As described above, the link registration service system 300 may share benefits made by the user redirected to the external page through link information registered to the content with the content creator. By sharing benefits, the content creator may achieve additional benefits through content, such as an image, a video, a music video, etc., registered to an SNS, and the link registrant may have no need to create separate content for registering link information.

The methods according to at least one example embodiment may be configured as program instructions executable through a variety of computer systems and recorded in non-transitory computer-readable media.

A program according to the example embodiments may be configured as a PC-based program or an application exclusive for a mobile terminal. A service application according to at least one example embodiment may be configured in an independently operating program form or an in-app form of a specific application to be operable on the specific application.

Also, the methods according to at least one example embodiment may be performed in such a manner that the service application controls a content creator terminal, a link registrant terminal, and/or a user terminal. The application may be installed in the content creator terminal, the link registrant terminal, and/or the user terminal through a file provided from a file distribution system. For example, the file distribution system may include a file transmitter (not shown) to transmit the file in response to a request from the content creator terminal, the link registrant terminal, and/or the user terminal.

Figure 11:
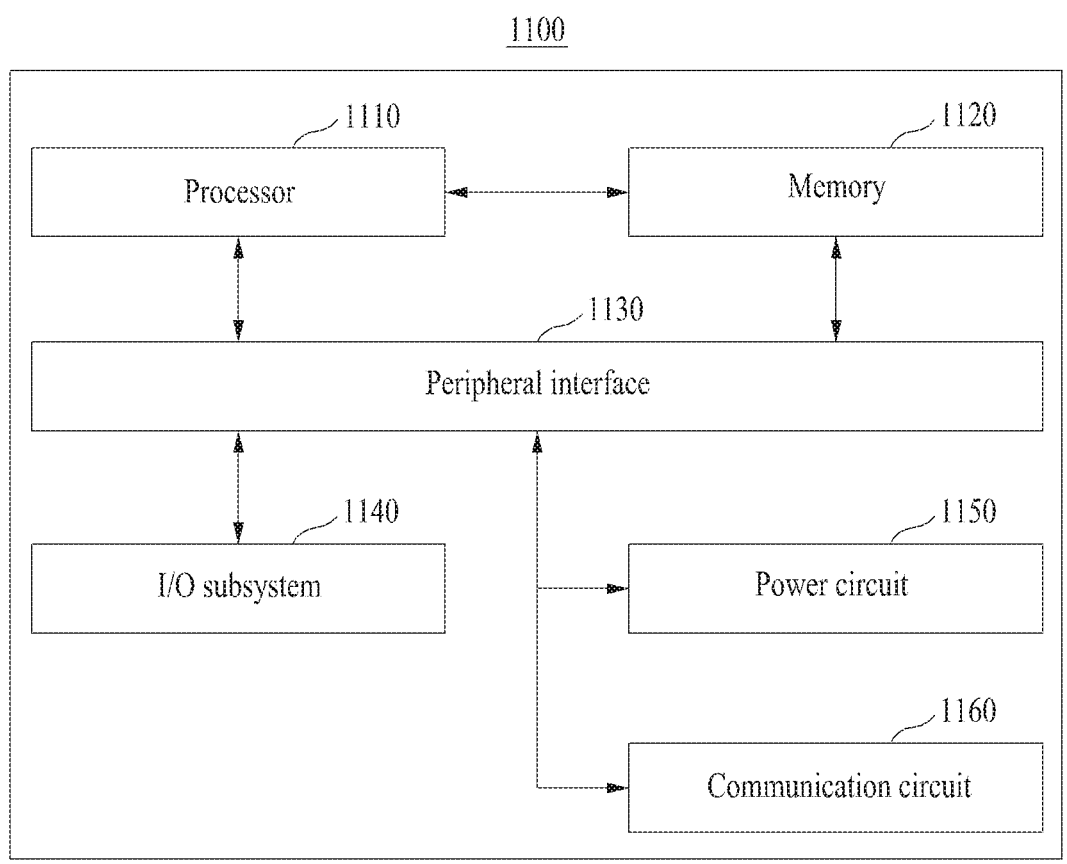
FIG. 11 is a block diagram illustrating an example of a computer system according to at least one example embodiment.

FIG. 11 is a block diagram illustrating an example configuration of a computer system according to at least one example embodiment. Referring to FIG. 11, a computer system 1100 includes at least one processor 1110; a memory 1120; a peripheral interface 1130; an input/output (I/O) subsystem 1140; a power circuit 1150; and a communication circuit 1160. The computer system 1100 may correspond to a user terminal.

The memory 1120 may include, for example, a high-speed random access memory (HSRAM), a magnetic disk, a static random access memory (SRAM), a dynamic RAM (DRAM), read only memory (ROM), a flash memory, a non-volatile memory, etc. The memory 1120 may include a software module, an instruction set, or a variety of data required for operation of the computer system 1100. In at least one example embodiment, access from another component, such as the processor 1110 and the peripheral interface 1130, to the memory 1120 may be controlled by the processor 1110.

The peripheral interface 1130 may couple an input device and/or output device of the computer system 1100 with the processor 1110 and the memory 1120. The processor 1110 may perform a variety of functions for the computer system 1100 and process data by executing the software module and/or the instruction set stored in the memory 1120.

The I/O subsystem 1140 may couple various I/O peripheral devices with the peripheral interface 1130. For example, the I/O subsystem 1140 may include a controller for coupling the peripheral interface 1130 and a peripheral device, such as a monitor, a keyboard, a mouse, a printer, a touch screen and/or a sensor depending on a necessity. The I/O peripheral devices may be coupled with the peripheral interface 1130 without using the I/O subsystem 1140.

The power circuit 1150 may supply power to all, or a portion, of components of a terminal. For example, the power circuit 1150 may include a power management system, at least one power source such as a battery and alternating current (AC) circuit, a charge system, a power failure detection circuit, a power converter or inverter, a power status indicator, and/or other components for creating, managing and/or distributing power.

The communication circuit 1160 enables communication with another computer system using at least one external port. Alternatively, as described above, the communication circuit 1160 may enable communication with another computer system by including a radio frequency (RF) circuit, and thereby transmitting and receiving an RF signal known as an electromagnetic signal.

The example embodiment of FIG. 11 is only an example of the computer system 1100. The computer system 1100 may have a configuration and/or an arrangement in which a portion of the components illustrated in FIG. 11 is/are omitted, further components not illustrated in FIG. 11 are included, or two or more components are coupled together. For example, a computer system for a communication terminal of a mobile environment may further include a touch screen, a sensor, and the like, in addition to the components of FIG. 11. A circuit for RF communication using a variety of communication methods, for example, wireless fidelity (Wi-Fi), 3rd generation (3G), 4th generation (4G), 5th generation (5G) long term evolution (LTE), Bluetooth, near field communication (NFC), and ZigBee, may be included in the communication circuit 1160. Components that may be included in the computer system 1100 may be configured as hardware that includes one or more integrated circuits specified for at least one signal processing or application, software, or a combination of hardware and software.

A service method for registering link information to the content may include a greater or reduced number of operations based on the detailed description made above with reference to FIGS. 1 through 11. Also, two or more operations may be combined and order or positions of the operations may be modified.

The methods according to at least one example embodiment may be configured as program instructions executable through a variety of computer systems and recorded in non-transitory computer-readable media.

As described above, according to at least one example embodiment, by registering link information requested from a link registrant terminal to content uploaded from a content creator terminal and by displaying content to which link information is registered and content to which link information is not registered simultaneously in order to avoid indicating whether link information is registered, it is possible to maintain a QoS of content to which link information is registered.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A link registration service method, the method comprising:
   receiving a first instance of content from a content creator terminal, the first instance of content being associated with a right, the right indicating that registration of link information specifically to the first instance of content is enabled, the registration of link information to the first instance of content including associating the first instance of content with an external network page associated with the link information;
   selectively registering a particular instance of link information specifically to the first instance of content based on the right indicating that registration of link information specifically to the first instance of content is enabled and receipt of a request to register the particular instance of link information to the first instance of content, the particular instance of link information being associated with a particular external network page, to associate the first instance of content with the particular external network page;
   transmitting the first instance of content to which the particular instance of link information is registered to a user terminal, a link registration service system causing the user terminal to display the first instance of content on a common display interface together with another instance of content to which an instance of link information is not registered and causing the user terminal not to display information associated with the particular instance of link information and information associated with the particular external network page on the common display interface with the first instance of content such that the first instance of content to which the particular instance of link information is registered is displayed on the common display interface in the same manner of display of said another instance of content to which an instance of link information is not registered;

receiving, by the link registration service system, an indication from the user terminal that the displayed first instance of content has been selected; and based on the received indication, causing, by the link registration service system, the user terminal to display the particular external network page, the link registration service system causing the user terminal to display the particular external network page by transmitting the particular instance of link information to the user terminal.

2. The method of claim 1, wherein the registering the particular instance of link information to the first instance of content based on the right includes replacing link information preregistered to the first instance of content with the particular instance of link information based on a bidding competition.

3. The method of claim 1, wherein the registering the particular instance of link information to the first instance of content based on the right includes maintaining registration of preregistered link information to the first instance of content for a particular period of elapsed time.

4. The method of claim 1, wherein the registering the particular instance of link information to the first instance of content based on the right includes selecting the particular instance of link information based on a bidding competition and in response to receiving a request to register a plurality of instances of link information to the first instance of content.

5. The method of claim 1, wherein the registering the particular instance of link information to the first instance of content based on the right includes, receiving a plurality of content;

extracting one or more instances of content from the received plurality of content based on the one or more instances of content being associated with the right;

identifying the first instance of content, from the one or more instances of extracted content, as being associated with a particular keyword, the particular keyword being associated with the particular instance of link information; and transmitting the identified first instance of content to a link registrant terminal.

6. The method of claim 5, wherein the registering the particular instance of link information to the first instance of content based on the right includes registering the particular instance of link information to one or more instances of content selected at the link registrant terminal from among the one or more instances of extracted content.

7. The method of claim 1, wherein the registering the particular instance of link information to the first instance of content based on the right includes registering different instances of link information with separate objects of a plurality of objects included in the first instance of content.

8. The method of claim 1, wherein the receiving the first instance of content includes receiving a second instance of content from the content creator terminal, the second instance of content being associated with a right indicating that registration of link information to the second instance of content is disabled.

9. The method of claim 1, further comprising:

generating charge information according to a user connection to the particular external network page, based on the user terminal selecting the first instance of content and displaying the particular external network page based on the selecting.

10. The method of claim 1, further comprising:

generating reward information according to a user connection to the particular external network page, based on the user terminal selecting the first instance of content and displaying the particular external network page based on the selecting.

11. A non-transitory computer-readable medium storing computer readable instructions which, when executed by a computer system, cause the computer system to perform a method, the method comprising:

receiving a first instance of content from a content creator terminal, the first instance of content being associated with a right, the right indicating that registration of link information specifically to the first instance of content is enabled, the registration of link information to the first instance of content including associating the first instance of content with an external network page associated with the link information;

selectively registering a particular instance of link information specifically to the first instance of content based on the right indicating that registration of link information specifically to the first instance of content is enabled and receipt of a request to register the particular instance of link information to the first instance of content, the particular instance of link information being associated with a particular external network page, to associate the first instance of content with the particular external network page;

transmitting the first instance of content to which the particular instance of link information is registered to a user terminal, a link registration service system causing the user terminal to display the first instance of content on a common display interface together with another instance of content to which an instance of link information is not registered and causing the user terminal not to display information associated with the particular instance of link information and information associated with the particular external network page on the common display interface with the first instance of content such that the first instance of content to which the particular instance of link information is registered is displayed on the common display interface in the same manner of display of said another instance of content to which an instance of link information is not registered;

receiving, by a link registration service system, an indication from the user terminal that the displayed first instance of content has been selected; and based on the received indication, causing, by the link registration service system, the user terminal to display the particular external network page, the link registration service system causing the user terminal to display the particular external network page by transmitting the particular instance of link information to the user terminal.

12. A link registration service system comprising:

a memory having computer-readable instructions stored therein; and a processor configured to execute the computer-readable instructions to, receive a first instance of content from a content creator terminal, the first instance of content being associated with a right, the right indicating that registration of link information specifically to the first instance of content is enabled, the registration of link information to the first instance of content including establishing a link between the first instance of content and an external network page associated with the link information;

selectively register a particular instance of link information specifically to the first instance of content based on the right indicating that registration of link information specifically to the first instance of content is enabled and receipt of a request to register the particular instance of link information to the first instance of content, the particular instance of link information being associated with a particular external network page, to associate the first instance of content with the particular external network page;

transmit the first instance of content to which the particular instance of link information is registered to a user terminal;

cause the user terminal to display the first instance of content on a common display interface together with another instance of content to which an instance of link information is not registered;

cause the user terminal not to display information associated with the particular instance of link information and information associated with the particular external network page on the common display interface with the first instance of content such that the first instance of content to which the particular instance of link information is registered is displayed on the common display interface in the same manner of display of said another instance of content to which an instance of link information is not registered;

receive an indication from the user terminal that the displayed first instance of content has been selected; and based on the received indication, cause the user terminal to display the particular external network page by transmitting the particular instance of link information to the user terminal.

13. The link registration service system of claim 12, wherein the processor is configured to execute the computer-readable instructions to further, replace link information preregistered to the first instance of content with the particular instance of link information based on a bidding competition.

14. The link registration service system of claim 12, wherein the processor is configured to execute the computer-readable instructions to further, maintain registration of preregistered link information to the first instance of content for a particular period of elapsed time.

15. The link registration service system of claim 12, wherein the processor is configured to execute the computer-readable instructions to further, receive a plurality of content;

extract one or more instances of content from the received content based on the one or more instances of content being associated with the right, identify the first instance of content, from the one or more instances of extracted content, as being associated with a particular keyword, the particular keyword being associated with the particular instances of link information; and transmit the identified first instance of content to a link registrant terminal.

16. The link registration service system of claim 12, wherein the processor is configured to execute the computer-readable instructions to further, receive content associated with a designated bidding price range from the content creator terminal in response to receiving a request for registering a plurality of instances of link information to the content.

17. The link registration service system of claim 12, wherein the processor is configured to execute the computer-readable instructions to further receive content associated with a right indicating that the registration of link information is disabled.

18. The link registration service system of claim 12, wherein the processor is configured to execute the computer-readable instructions to further generate charge information and reward information according to a user connection to the particular external network page, based on the user terminal selecting the first instance of content to which the link information is registered and displaying the particular external network page based on the selecting.

* * * * *